(12) United States Patent
Matrosov et al.

(10) Patent No.: US 12,591,830 B2
(45) Date of Patent: **\*Mar. 31, 2026**

(54) MACHINE LEARNING APPROACH TO IDENTIFY SOFTWARE SUPPLY CHAIN VULNERABILITIES FROM BINARY CODE SIMILARITY DETECTION

(71) Applicant: Binarly Inc, Santa Monica, CA (US)

(72) Inventors: Alexander Matrosov, Santa Monica, CA (US); Sam Lloyd Thomas, Birmingham (GB); Yegor Vasilenko, Cambridge (GB)

(73) Assignee: Binarly Inc, Santa Monica, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/639,805

(22) Filed: Apr. 18, 2024

(65) Prior Publication Data

US 2025/0322207 A1 Oct. 16, 2025

Related U.S. Application Data

(60) Provisional application No. 63/632,486, filed on Apr. 10, 2024.

(51) Int. Cl.
| | |
|---|---|
| *G06Q 10/06* | (2023.01) |
| *G06F 21/50* | (2013.01) |
| *G06F 21/57* | (2013.01) |
| *G06N 3/044* | (2023.01) |

(Continued)

(52) U.S. Cl.
CPC ......... *G06Q 10/0635* (2013.01); *G06F 21/50* (2013.01); *G06F 21/577* (2013.01); *G06N*

*3/044* (2023.01); *G06N 20/00* (2019.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 2020/0394028 A1* | 12/2020 | Byrne .................. | G06F 9/45558 |
| 2022/0210202 A1* | 6/2022 | Crabtree ............. | G06F 16/2477 |
| 2023/0141948 A1 | 5/2023 | Menashe et al. | |

(Continued)

OTHER PUBLICATIONS

Marx et al., "Computer-Aided Extraction of Software Components", 2010, 2010 17th Working Conference on Reverse Engineering, vol. 17 (2010), pp. 183-192 (Year: 2010).*

(Continued)

*Primary Examiner* — Van C Mang
(74) *Attorney, Agent, or Firm* — Jones Day

(57) ABSTRACT

A software package is received and unpacked into a plurality of components. Features are extracted from each component which are indicative (i.e., useful, etc.) in determining whether such component presents a software supply chain risk. The extracted features are consumed by one or more machine learning models to determine a level of supply chain risk associated with the component. This determined level of supply chain risk can be provided to a consuming application or process. Component identities can also be identified using machine learning or other similarity analyses. In some cases, embeddings are used to characterize risk and/or provide component identities. Related apparatus, systems, techniques and articles are also described.

24 Claims, 7 Drawing Sheets

600

(51) Int. Cl.
| | | |
|---|---|---|
| *G06N 20/00* | (2019.01) | |
| *G06Q 10/0635* | (2023.01) | |

(56)                    References Cited

U.S. PATENT DOCUMENTS

2023/0359744 A1 * 11/2023 Duggan .............. G06F 21/6227
2024/0403425 A1   12/2024 Shimada et al.

OTHER PUBLICATIONS

Ma et al., "GraphCode2Vec: generic code embedding via lexical and program dependence analyses", 2022, MSR '22: Proceedings of the 19th International Conference on Mining Software Repositories, vol. 19 (2022), pp. 524-536 (Year: 2022).*

Li et al., "Topology-Aware Hashing for Effective Control Flow Graph Similarity Analysis", 2019, Security and Privacy in Communication Networks: 15th EAI International Conference, vol. 15 (2019), pp. 278-298 (Year: 2019).*

Sun et al., "Software Supply Chain Analysis Based on Function Similarity", 2020, Journal of Physics: Conference Series, vol. 2020, pp. 1-6 (Year: 2020).*

Luo et al., "Binary Code Similarity Detection through LSTM and Siamese Neural Network", 2021, EAI Endorsed Transactions on Security and Safety, vol. 8.29, pp. 1-10 (Year: 2021).*

Grieco et al., "Toward Large-Scale Vulnerability Discovery using Machine Learning", 2016, CODASPY '16: Proceedings of the Sixth ACM Conference on Data and Application Security and Privacy, vol. 2016, pp. 85-96 (Year: 2016).*

Collyer et al., "FASER: Binary Code Similarity Search through the use of Intermediate Representations", 2023, arXiv, v3, pp. 1-12 (Year: 2023).*

Jiang et al., "BinaryAI: Binary Software Composition Analysis via Intelligent Binary Source Code Matching", Jan. 23, 2024, arXiv, v2, pp. 1-13 (Year: 2024).*

Zhang et al., "Learning Semantic Representation for Binary Code Similarity Detection", Mar. 23, 2024, International Conference on Artificial Intelligence in China, vol. 2023, pp. 481-491 (Year: 2024).*

Zhang et al., "PDG2Vec: Identify the Binary Function Similarity with Program Dependence Graph", 2022, 2022 IEEE 22nd International Conference on Software Quality, Reliability and Security (QRS), vol. 22 (2022), pp. 537-548 (Year: 2022).*

Wu et al., "Code Similarity Detection Based on Siamese Network", 2021, 2021 IEEE International Conference on Information Communication and Software Engineering (ICICSE), vol. 2021, pp. 47-51 (Year: 2021).*

Tian et al., "BinDeep: A deep learning approach to binary code similarity detection", 2021, Expert Systems with Applications, vol. 168, pp. 1-9 (Year: 2021).*

Hung et al., "Binary Representation Embedding and Deep Learning For Binary Code Similarity Detection in Software Security Domain", 2023, SOICT '23: Proceedings of the 12th International Symposium on Information and Communication Technology, vol. 12, pp. 785-792 (Year: 2023).*

Liu et al., "PG-VulNet: Detect Supply Chain Vulnerabilities in IoT Devices using Pseudo-code and Graphs", 2022, ESEM '22: Proceedings of the 16th ACM / IEEE International Symposium on Empirical Software Engineering and Measurement, vol. 16 (2022), pp. 205-215 (Year: 2022).*

Vo et al., "Can an old fashioned feature extraction and a light-weight model improve vulnerability type identification performance?", 2023, Information and Software Technology, vol. 164, pp. 1-9 (Year: 2023).*

Li et al., "Multi-feature Based Function Embedding Network for Binary Code Similarity", 2023, Authorea Preprints (Year: 2023).*

Kent, "MSI Viewer", 2020, Microsoft Store, retrieved from https://apps.microsoft.com/detail/9mztr9qs01gn?hl=en-US&gl=NL on Dec. 9, 2024 (Year: 2020).*

Zhan et al., "ATVHunter: Reliable Version Detection of Third-Party Libraries for Vulnerability Identification in Android Applications", 2021, 2021 IEEE/ACM 43rd International Conference on Software Engineering (ICSE), vol. 43 (2021), pp. 1695-1707 (Year: 2021).*

Kim et al., "Identifying Windows Installer Package Files for Detection of Pirated Software", 2014, 2014 Eighth International Conference on Innovative Mobile and Internet Services in Ubiquitous Computing, vol. 8 (2014), pp. 287-290 (Year: 2014).*

DeBona, "Hex-Rays Microcode API vs. Obfuscating Compiler", 2018, Hex-Rays, retrieved from https://hex-rays.com/blog/hex-rays-microcode-api-vs-obfuscating-compiler on Dec. 9, 2024 (Year: 2018).*

Ezen-Can, "A Comparison of LSTM and BERT for Small Corpus", 2020, arXiv, v1, pp. 1-12 (Year: 2020).*

Bitam, "Introduction to Hex-Rays decompilation internals", Feb. 13, 2024, Elastic Security Labs, retrieved from https://www.elastic.co/security-labs/introduction-to-hexrays-decompilation-internals on Mar. 27, 2025 (Year: 2024).*

Skochinsky, "Igor's tip of the week #56: String literals in pseudo-code", 2021, Hex-Rays, retrieved from https://hex-rays.com/blog/igors-tip-of-the-week-56-string-literals-in-pseudocode on Mar. 27, 2025 (Year: 2021).*

Zagane et al., "Deep Learning for Software Vulnerabilities Detection Using Code Metrics", 2020, IEEE Access, vol. 8, pp. 74562-74570 (Year: 2020).*

Hamama, "Detecting Design Patterns by Learning Embedded Code Features", 2021, Munster Technological University (Year: 2021).*

Lei et al., "IRC-CLVul: Cross-Programming-Language Vulnerability Detection with Intermediate Representations and Combined Features", 2023, Electronics, vol. 12, pp. 1-18 (Year: 2023).*

Hex-Rays, "IDA Pro", Apr. 1, 2024, Hex-Rays, retrieved from https://hex-rays.com/blog/hex-rays-microcode-api-vs-obfuscating-compiler on Mar. 27, 2025 (Year: 2024).*

Cornell University, "Control Data Flow Graph", 2021, retrieved from https://www.csl.cornell.edu/~zhiruz/5997/pdf/lecture04.pdf on Oct. 3, 2024 (Year: 2021).*

Cifuentes, 1996, "Structuring Decompiled Graphs," International Conference on Compiler Construction 1996:91-105.

Cornell University, 2021, "Control Data Flow Graph," retrieved from https://www.esl.comnell.edu/~zbiruz/5997/pdf/lecture04.pdf on Oct. 3, 2024.

Sun et al., 2024, "A Knowledge-drien Framework for Software Supply Chain Security Analysis," CCEAI '24: Proceedings of the 2024 8th International Conference on Control Engineering and Artificial Intelligence 2024:267-272.

Xu et al., 2017, "Neural Network-based Graph Embedding for Cross-Platform Binary Code Similarity Detection," CCS '17: Proceedings of the 2017 ACM SIGSAC Conference on Computer and Communications Security 2017:363-376.

Yang et al., 2022, "ModX: Binary Level Partially Imported Third-Party Library Detection via Program Modularization and Semantic Matching," 2022 IEEE / ACM 44th International Conference on Software Engineering (ICSE) 44:1393-1405.

Zhao et al., 2022, "A Large-Scale Empirical Analysis of the Vulnerabilities Introduced by Third-Party Components in IoT Firmare," Proceedings of the 31st ACM SIGSOFT International Symposium on Software Testing and Analysis 31:442-454.

* cited by examiner

MACHINE LEARNING APPROACH TO IDENTIFY SOFTWARE SUPPLY CHAIN VULNERABILITIES FROM BINARY CODE SIMILARITY DETECTION

RELATED APPLICATION

The current application claims priority to U.S. Pat. App. Ser. No. 63/632,486 filed on Apr. 10, 2024, the contents of which are hereby fully incorporated by reference.

TECHNICAL FIELD

The subject matter described herein relates to machine learning-based techniques for identifying anomalous characteristics of components within software packages which may cause a computing system to exhibit undesired behavior.

BACKGROUND

The transformation from source code to a binary file representation (sometimes referred to as a "binary" or an "executable") introduces a number of security risks which are often difficult to identify and otherwise assess. Malicious actors, whether through a compiler or otherwise, can covertly insert code within build systems to cause systems to exhibit undesired behavior. The increasing complexity of software packages and their interdependencies, in turn, increases the difficulty of finding vulnerabilities. Further, the process of compilation can result in other risks such as introducing new vulnerabilities or reversing security measures implemented in source code thereby exacerbating the security risks.

Also of note, vulnerabilities introduced into a binary are problematic at the firmware layer which ensures that all other security layers function effectively. In particular, compromised firmware can act undermine all other security investments.

SUMMARY

In a first aspect, a software package is received. It is unpacked into a plurality of components from which features are extracted or otherwise derived which are indicative of supply chain (i.e., software supply chain) risk. At least one machine learning model, using the features, determines a level of supply chain risk associated with the component. Data characterizing the determined level of supply chain risks are provided to a consuming application or process.

In some variations, each component can be lifted into an intermediate representation so that at least one embedding, which preserves code semantics can be generated therefrom. In some variations, at a least a portion of the extracted or derived features are from the intermediate representation and/or the embedding.

The at least one machine learning model can include an ensemble of machine learning models, each trained to score a different supply chain risk category. The at least one machine learning model can include a multi-class classifier in which each class scores a different supply chain risk category.

The different supply chain risk categories can take varying forms including, for example, one or more of: an open-source software control category which characterizes risks of changes introduced by new versions, a vulnerability category which characterizes security risks in components, a license category which characterizes risks associated with compliance of intellectual property (IP) legal requirements, a development category which characterizes risks of compatibility between a pre-defined codebase and open-source software, and/or a support category which characterizes risks associated with older or obsolete software components.

The consuming application or process can generate a report or populate a dashboard interface based on the determined level of supply chain risks.

The determined level of supply chain risks can include individual scores for each of the components in the software package. In addition or in the alternative, the determined level of supply chain risks comprises an overall score for the software package.

The extracted or derived features can characterize sequences of instructions or statements in the corresponding component and/or flow of data in the corresponding component.

In an interrelated aspect, a software package is received and then unpacked into a plurality of components. Features useful in identifying the component are extracted or otherwise derived from the component. It is then determined, using at least one machine learning model and based on the features, a level of code similarity associated with the component. This determined level of code similarity can be provided to a consuming application or process.

In some cases, the provided determined level of code similarity comprises an identification of the corresponding component. The consuming application or process can be a vulnerability database service which returns software supply chain risk information for matching components.

In some variations, each component is lifted into a corresponding intermediate representation. An embedding (or a plurality of embeddings) can be generated for each intermediate representation which preserves code semantics from the corresponding component. At least a portion of the extracted or derived features are based on the intermediate representation and the embedding.

The at least one machine learning model can be a semantics preserving code embedding model such as, for example, a recurrent neural network.

The at least one machine learning model comprises a control-flow graph (CFG) similarity model such as, for example, a graph embedding model.

The at least one machine learning model can be trained by extracting or deriving features from intermediate representations of functions from exemplary components and building function triplets and using a Siamese network with triplet loss.

The consuming application or process can include a second machine learning model configured and trained to characterize a supply chain risk score of the software package based on the determined level of code similarity.

In yet another variation, a software package is received and then unpacked into a plurality of components. Each component is lifted into an intermediate representation. Features are extracted or otherwise derived from both of the components and the intermediate representations for ingestion by at least one first machine learning model to determine software supply chain risk for the corresponding components. Data characterizing the determined software supply chain risks can be provided to a consuming application or process. In addition, at least one embedding can be generated for each intermediate representation using at least one second machine learning model. These embeddings are arranged so as to preserve code semantics from the corresponding component. A component identification module (e.g., at least one third machine learning model, etc.) can use the embeddings to directly or indirectly (using a lookup service with a vulnerability database) to determine an identity of the component. Data characterizing the determined component identities can be provided to a consuming application or process (which may be the same or different from the output of the at least one first machine learning model).

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides machine learning-based techniques for more precisely and rapidly identifying software supply chain security risks in software packages without having access to source code.

The details of one or more variations of the subject matter described herein are set forth in the accompanying drawings and the description below. Other features and advantages of the subject matter described herein will be apparent from the description and drawings, and from the claims.

DETAILED DESCRIPTION

The subject matter described herein relates to machine learning-based techniques for identifying anomalous characteristics of software packages which may cause a computing system to exhibit undesired behavior. The utilized machine learning models can be trained using different attributes including code sematic properties from a corpus of software packages.

Figure 1:
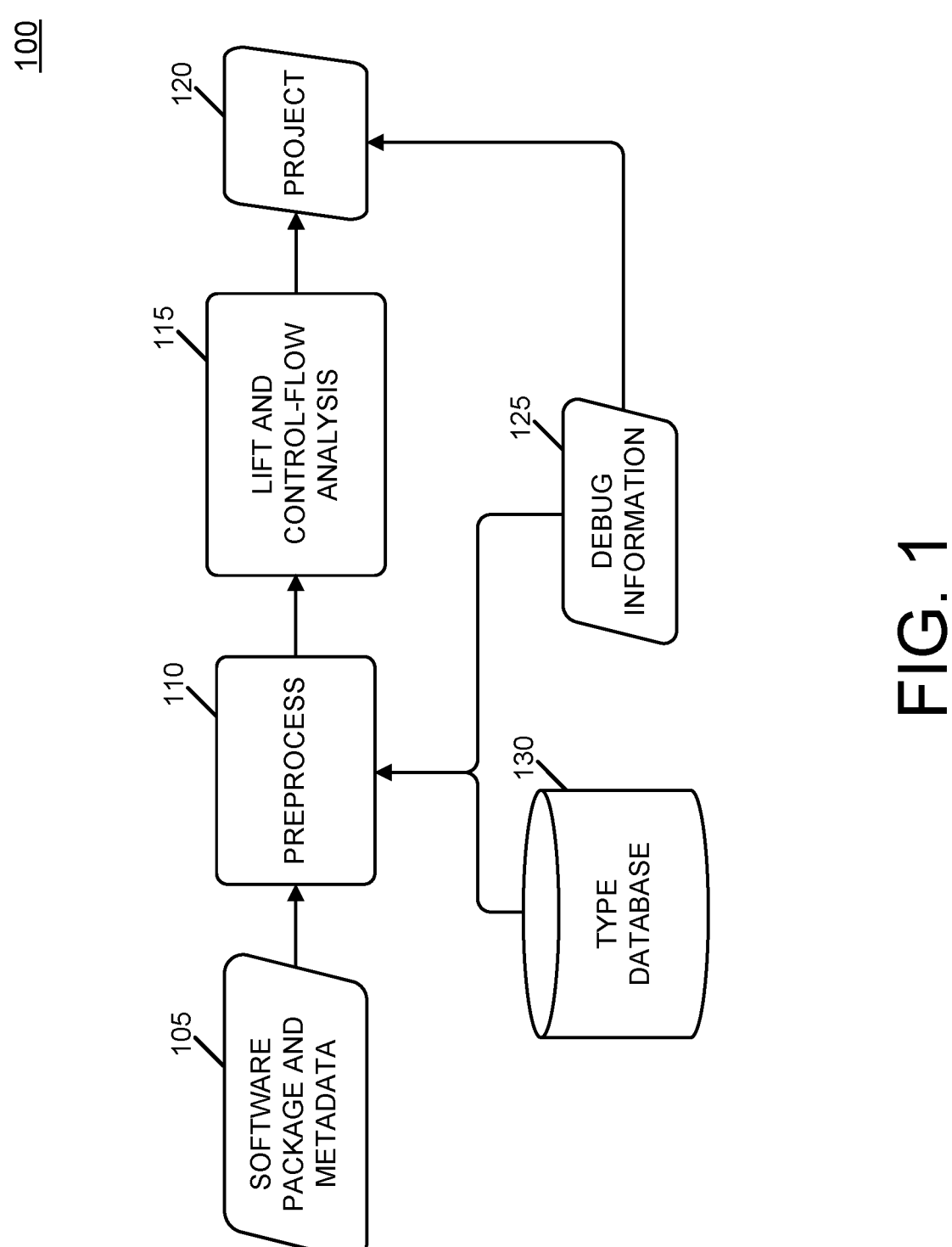
FIG. 1 is a diagram illustrating a process for characterizing the contents of a software package.

FIG. 1 is a diagram 100 directed to the processing and analysis of a software package. Software packages, in this context unless otherwise specified, can comprise executables, binaries, and libraries and generally can provide coordinated functionality. Initially, at 105, a software package and associated metadata is accessed or otherwise received. This software package contains a plurality of components which need to be identified or otherwise analyzed for the assessment of security vulnerabilities. A software component can be characterized as a unit of composition with contractually specified interfaces and explicit context dependencies only. Components can take varying forms such as a views, models, controllers, data access objects, services, plugins, APIs or other modules that encapsulate a set of related functions or data. Components can communicate (e.g., through function calls, etc.) with each other via corresponding interfaces.

The metadata can provide context for the software package (and its contents) including information about component creation, structure, purpose, and dependencies. The metadata can form part of the software package or comprise a separate file or series of files. The software package and metadata can be preprocessed, at 110, which can include unpacking/parsing the software package into the plurality of components so that they may be separately analyzed. The metadata for individual components can, in some cases, be updated to include complementary information from a type database 130 and/or a debugging database 125 which results in an annotated component. Metadata can include provide additional contextual information regarding software package components, such as the vendor, meaning of the component, dependencies on third-party code, and more.

The type database 130 can be a database such as a key-value NoSQL or graph database that stores information regarding complex types like C/C++ structures or objects. The debugging database 125 can provide alerts or fixes for known bugs associated with the particular component at the function or other level.

As used herein, the component can be at the root level with all components being rooted to the software package. The software package is the root for every component. Components are a topic of analysis and the associated data is contextualized at the software package level.

Once the component has been further contextualized, the annotated component at 115, can be lifted into an intermediate representation (IR) so that a control flow analysis can be performed (i.e., a control flow graph can be generated which defines an order of execution of functions forming part of a component, etc.). IR is the data structure or code used by a compiler or virtual machine to represent the corresponding low-level machine instructions and which can represent the operational semantics of the corresponding code. The IR may be in an intermediate language which is configured for code analyses such as determining the control flow in which individual statements, instructions or function calls of a component within the software package are executed or evaluated. The control flow analysis can be performed using an IR topology extractor which reconstructs a control flow graph and a data flow graph during the lifting phase. In particular, the lifting and control-flow extraction can be used to identify functions as well as their basic block bounds and their connectivity. The results of the lifting and control-flow extraction are used to populate a project 120 which can be a hierarchical representation of the software package analysis. The project can be characterized as an aggregator of software packages. For example, the project could be associated with a specific device type or software product and aggregate multiple builds (recompilations) or different versions of the same software packages to provide a better way of contextualization and search for the results associated with a specific entity. The information about the software package components in the project 120 can be further enriched with information from the debugging database 125 such as the application of symbol information to provide function names.

Figure 2:
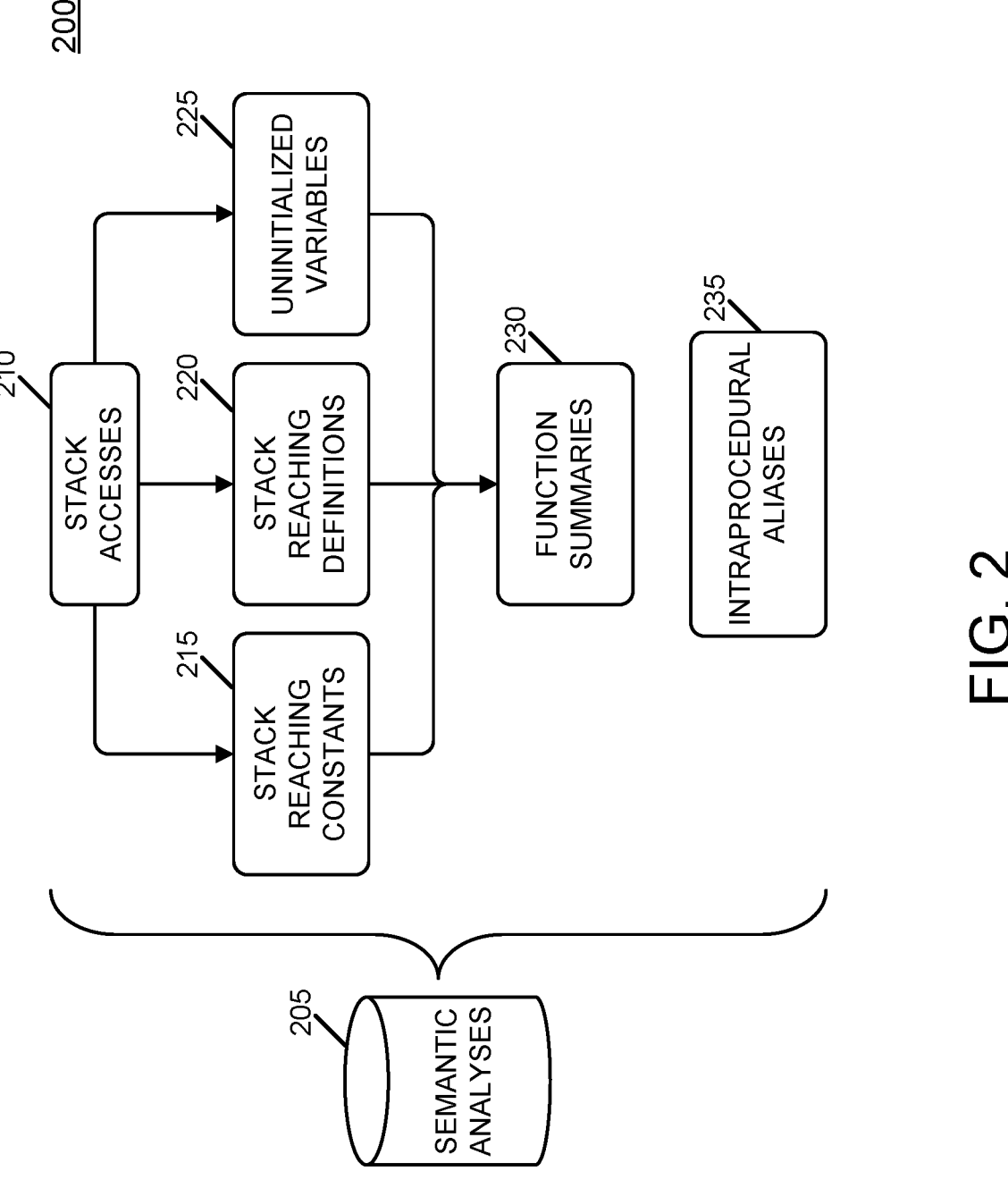
FIG. 2 is a diagram for characterizing functions utilized by components of a software package.

FIG. 2 is a diagram 200 illustrating different aspects that can be used to define the semantics of the software package which can be stored within a semantic analysis database 205 which characterizes the data flows through different functions (which differs from the control flow analysis). Using the IR of a software package, at 210, attributes associated with data flows through different functions (e.g., stack accesses for each function forming part of the software package, etc.) can be characterized. These attributes can include, at 215, whether there is a constant static variable on the stack. Such context provides additional details of the code semantics for the analysis and can, additionally, be beneficial for static analysis. The attributes can also include, at 220, the stack reaching definitions (i.e., particular place in a program/code and/or the point at which the variable gets killed or defined as a different variable). In addition, the attributes can include, at 225, whether there are any uninitialized variables. Uninitialized variables can have indeterminate values, which for objects of some types, result in undesired behavior (e.g., malicious activity, etc.). These different attributes can be used, at 230, to generate behavioral summaries for each function. In addition, the semantic analyses 205 can also include information characterizing intraprocedural aliases 235 which can identify alias information from different, intersecting execution paths which can be helpful as part of the overall analysis of the software package.

Figure 3:
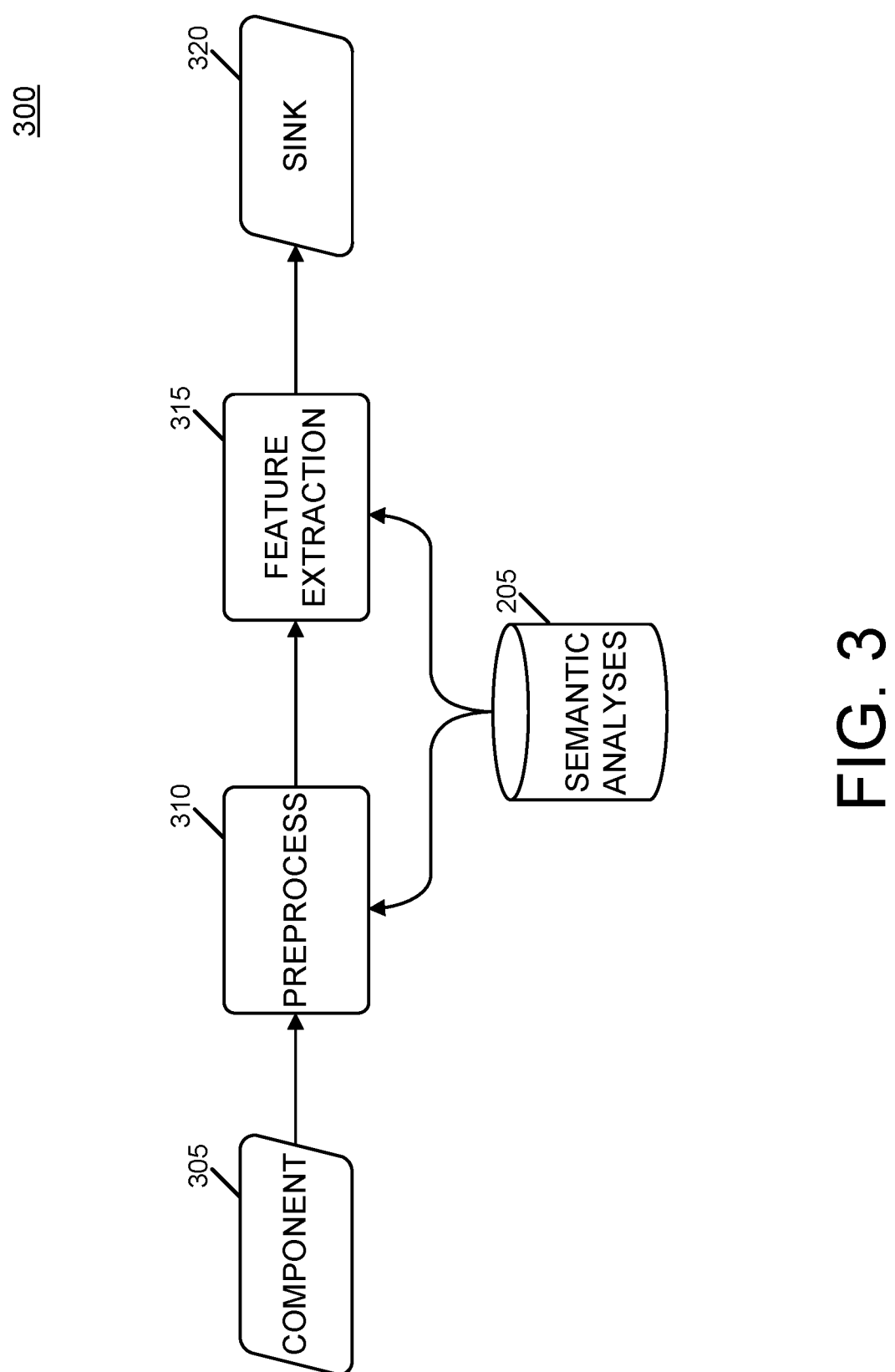
FIG. 3 is a diagram illustrating a workflow for preprocessing components and for feature extraction therefrom.

The semantic analyses 205 can be used as part of a workflow illustrated in the diagram 300 of FIG. 3. Each component 305 is preprocessed at 310 to be annotated component which includes additional contextual information about the encapsulated or otherwise utilized functions based on information stored in the semantic analyses database 205. Other preprocessing operations can be performed to allow, at 315, for features to be extracted such as coding attributes that describe the code semantics, such as pointers, complex types, and the like for training various machine learning model. These features can be or be derived from attributes of the component 305 which characterize software supply chain risk (i.e., the likelihood of a vulnerability being encapsulated within the software package, etc.). The extracted features can, by way of an intermediate sink 320, be consumed by one or more processes and applications (e.g., machine learning models (as described in further detail below), etc.).

Figure 4:
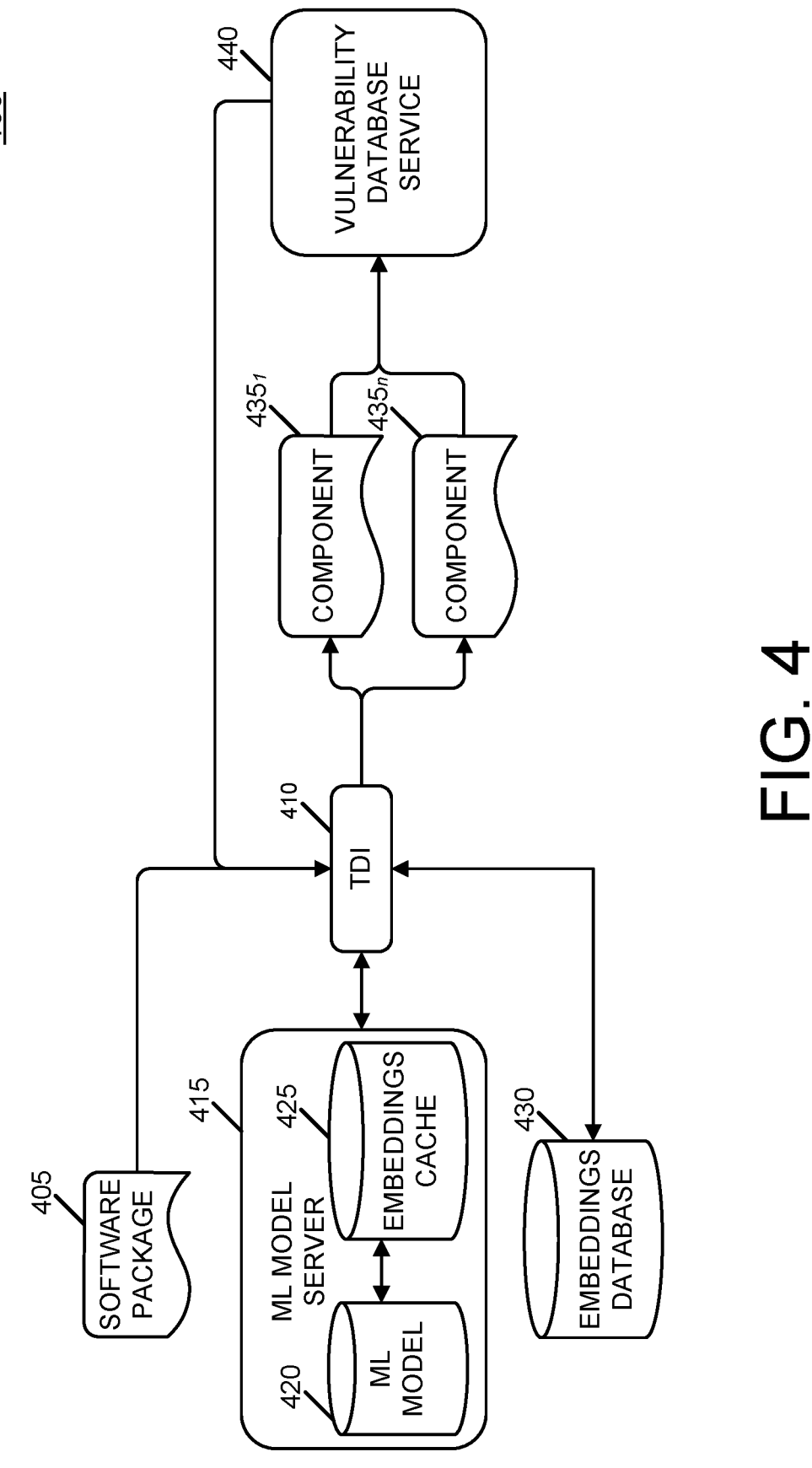
FIG. 4 is a diagram illustrating a workflow for identifying components within a software package using machine learning as part of a vulnerability analysis.

FIG. 4 is a diagram 400 illustrating a process in which a software package 405 is iteratively analyzed by a transitive dependency identifier (TDI) 410. For each component $435_{1 \ldots N}$ in the software package 405, the IRs for each function within such component can be analyzed. The TDI can leverage a machine learning model server 415 to help identify the components $435_{1 \ldots N}$ in the software package 405. The machine learning model server 415 can take different forms and can execute one or more machine learning models 420. The machine learning models 420 can take various forms and comprise an ensemble of models executing in sequence and/or in parallel. Example machine learning models 420 can include. These machine learning models can be trained, using, for example, a data set that characterizes decomposed software packages with the relations of components and functions inside each component. The resulting graphs used in the dataset corresponds with code semantics and data type relations to train the one or more machine learning models 420 to recognize not just a sequence of bytes but the code. The one or more machine learning models 420 can be trained using various training techniques including supervised, semi-supervised, and/or an unsupervised training techniques. In some cases, a lower dimensional representation of the function's IR representation can be used by the machine learning model 420. In some cases, this lower dimensionality can be an embedding generated through which can be stored in an embeddings cache 425 after being generated. The machine learning model server 415 can return information identifying each component $435_{1 \ldots N}$ in the software package 405 such as vendor, product name/ID, and version.

In some cases, the TDI 410 can generate an embedding of the IR of a function which is used to poll, using the embedding, an embeddings database 430 to see if the component has already been identified. The embeddings database 430 can store embeddings of a plurality of functions mapped to the same software component. In such cases, the embeddings database 430 can return information identifying or otherwise characterizing the component (e.g. vendor, product name/ID, version, etc.) to the TDI 410. The TDI 410 after identifying the components $435_{1 \ldots N}$ can poll a vulnerability database service 440 which can then return any known vulnerabilities for each component. These known vulnerabilities can be used to generate one or more reports. In some cases, these vulnerabilities are used to generate a supply chain risk score for the corresponding component and/or for the software package as a whole.

The machine learning model 420 can take various forms including: including one or all of: (i) a graph embedding model (e.g., node2vec, deepwalk, etc.); (ii) an IR to Vector (IR2V) model built with fastText classification algorithm in which input from each function's IR is normalized and tokenized; (iii) a recurrent neural network (RNN) which can, for example, be trained using a Siamese network with triplet loss in which input from each function's IR is normalized and tokenized. The aforementioned machine learning models 420 can be configured to be responsible for different part of the detection pipeline. As example one machine learning model 420 can detect malicious code changes, another machine learning model 420 can be focused on classification of it and the third machine learning model 420 can make an actional response based on previous context.

In some cases, the machine learning model 420 can be a code semantics/similarity model and take various forms including: RNN, Bi-RNN, transformer-based model architectures trained with triplet loss as part of a Siamese network. The Siamese network can contains the final network used to generate embeddings. Once training is finished, the RNN/Bi-RNN/transformer part can form the final version of the machine learning model 420.

Graph similarity models as used herein can take various forms so long as they provide the basis to produce a graph embedding such as node2vec, and DeepWalk.

An IR to vector embedding model as used herein can take various forms such as: FastText, Word2Vec-like models adapted to take IR as input (rather than text).

The machine learning model 420 can be trained using a dataset such as one based on EDK2 versions compiled with a different Microsoft Visual C++(MSVC) and GNU Compiler Collection (GCC) versions as well as optimization levels for three processor architectures ARM, x86, x86-64. Within the training dataset, each function's IR (i.e., an expression static single-assessment (SSA) form IR) is extracted and function triplets are built (anchor, positive sample, negative sample) to train the machine learning model 420 (e.g., the RNN, etc.). Such an arrangement preserves the code semantic properties of the exemplars forming part of the training set.

Figure 5:
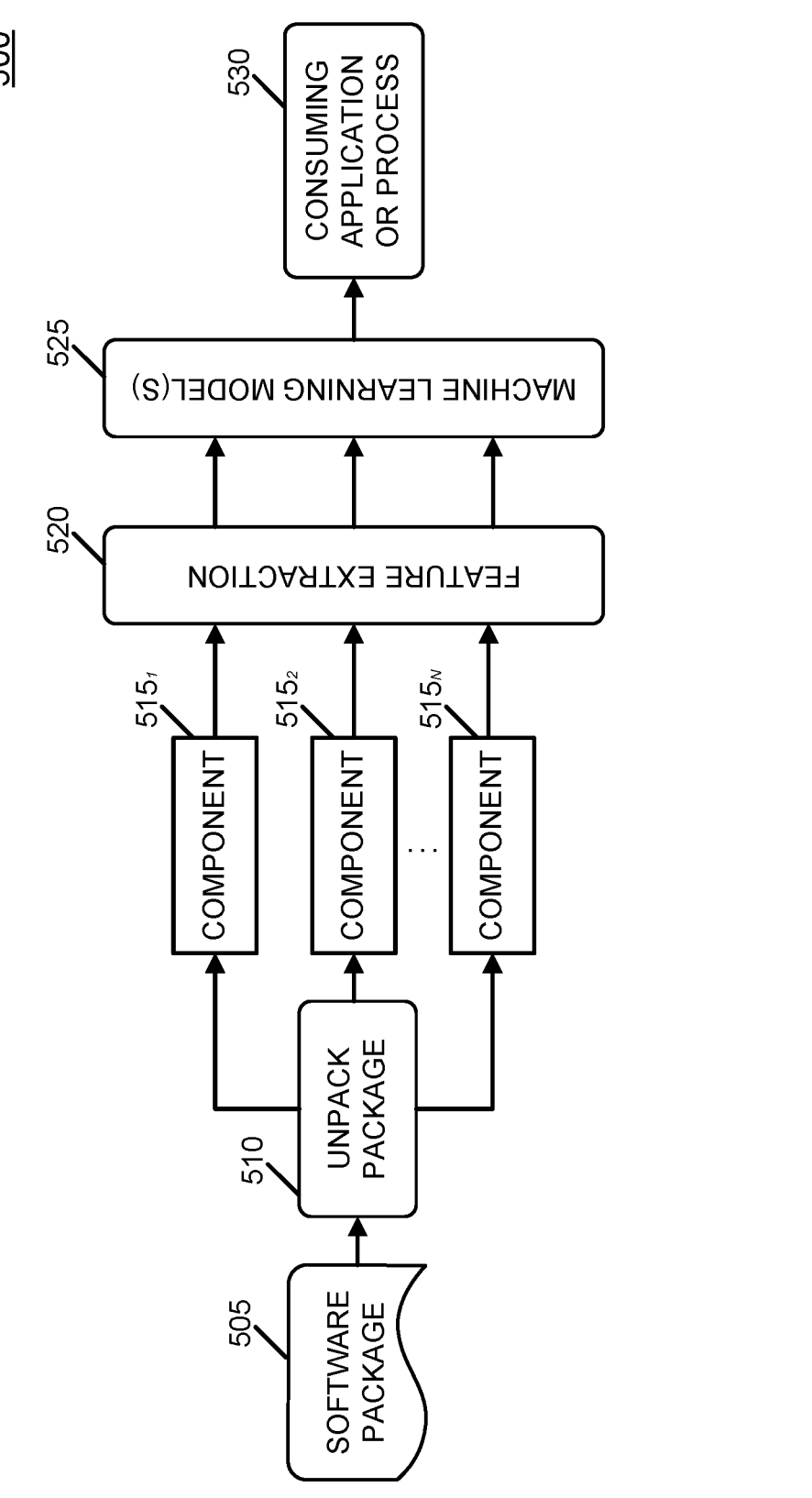
FIG. 5 is a first process flow diagram for identifying anomalous software packages or components therein using machine learning.

FIG. 5 is a first process flow diagram 500 in which machine learning is used to characterize a software package (e.g., provide vulnerability information, publisher information, version, applicable license, etc.). A software package 505 is received or otherwise accessed so that, at 510, it can be unpacked (e.g., decomposed, etc.) into the components $515_{1 \ldots N}$ contained therein. Unpacking can include reversing the applicable compression algorithm used to originally compress firmware code to allow for the parsing of the software package 505 so that software components can be extracted. From these components, at 520, various features can be extracted and optionally vectorized. These features can include various aspects relating to supply chain (and thus supply chain risk such as identity and provenance of components, etc.) including, as an example, attributes which characterize the data flow graph and control flow graph connecting the function calls specific order or data usage. The extracted features can additionally or alternative characterize behavioral attributes such as a purpose of specific API calls from the operation system or firmware.

The extracted features are input (either directly or after further processing) into a machine learning model 525. In some variations, an ensemble of machine learning models can be used. In some variations, a multi-class classifier can be used. The machine learning model 525 can be trained to infer, based on the extracted features, a level of supply chain risk is associated with the corresponding component $515_{1 \ldots N}$. The machine learning model 525 can be one or more of the models described above for machine learning model 420 and, in some cases, trained in a similar fashion.

The output of the machine learning model 525 can be provided, at 530, to a consuming application or process. The consuming application or process 530 can, for example, use the output to generate an overall supply chain risk score for the software package 510. In some cases, an overall supply chain risk score is generated by the machine learning model 525 (which is sent to the consuming application or process 530).

In some cases, the machine learning model 525 can be a multi-class classifier or an ensemble which is configured to score each of a plurality of different risk categories. An example multi-class classifier can work with direct IR, SSA and can provide for DFG and CFG detection and classification. For example, a first category can be an open-source software control category which characterizes risks of changes introduced by new versions. A second category can be a vulnerability category which characterizes security risks in components. A third category can be a license category which characterizes risks associated with the compliance of intellectual property (IP) legal requirements. A fourth category can be a development category which characterizes risks of compatibility between a pre-defined (e.g., existing) codebase and open-source software. A fifth category can be a support category which characterizes risks associated with older or obsolete software components. Different category types can be utilized depending on the particular risks being considered/analyzed for a software package. The risk scores can be conveyed to a user in a graphical user interface, stored locally, loaded into memory, and/or transmitted over a network to a remote computing system.

The consuming application or process 530 can utilize the output of the machine learning model 525 to take further actions which can include, generating reports (e.g., populating a security/vulnerability dashboard interface, generating or annotating a software bill of materials, etc.), taking remedial actions such as segregating a component $515_{1 \ldots N}$, and/or the software package 505. The scores can be used to characterize a potential security impact, and based on the impact classification, other types of remediation actions can be undertaken as provided in, for example, a knowledge base.

Figure 6:
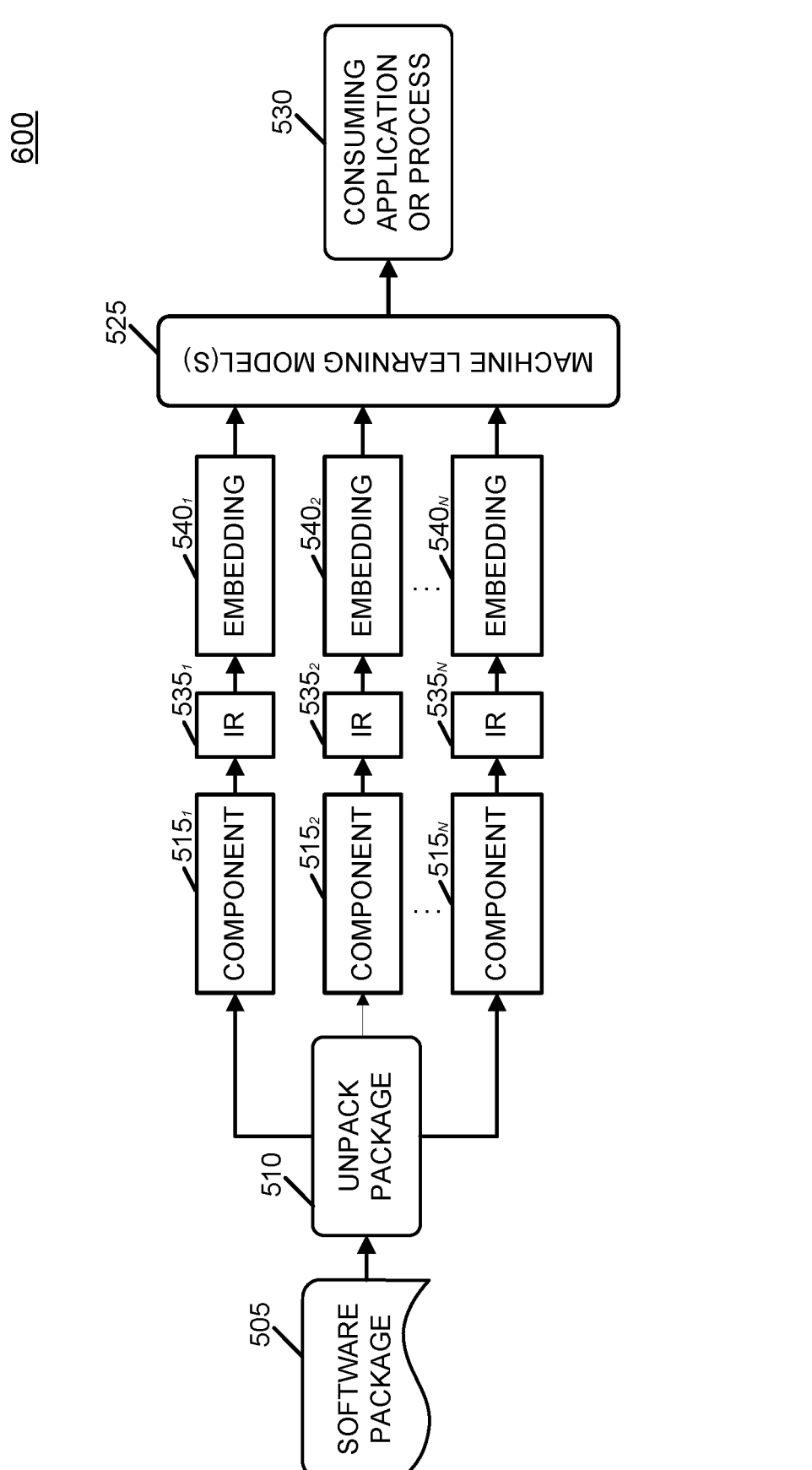
FIG. 6 is a second process flow diagram for identifying anomalous software packages or components therein using machine learning.

FIG. 6 is a diagram 600 illustrating a variation of FIG. 5 in which the software package 505 is also unpacked, at 510, into a plurality of components $515_{1 \ldots N}$. Unlike the example in FIG. 5, these components $515_{1 \ldots N}$ are lifted into a respective inter mediate representation (IR) $535_{1 \ldots N}$. Various techniques can be used for lifting the components $515_{1 \ldots N}$ into the IRs $535_{1 \ldots N}$ including those described above. As an example, static binary translation techniques can be utilized that translate machine code instructions into IR. To lift the code to IR on the first step is to decode the machine code bytes to IR instruction. This decoding step takes raw instruction bytes, and turns them into a higher-level IR instruction. These IRs $535_{1 \ldots N}$ are then used to generate embeddings $540_{1 \ldots N}$ through one or more dimensionality reduction processes. The embeddings $540_{1 \ldots N}$ can be generated using word embedding techniques which learn dense vector representations of words from IR data. The embedding process can include, as part of preprocessing, tokenizing the input and optionally performing other preprocessing. An embedding layer is generated by creating an embedding matrix to store learned word vectors after which such embedding matrix is randomly initiated with a specified dimensionality. These embeddings can be consumed by the machine learning model(s) 525 for supply chain risk scoring or other classifications such as component identity and/or component provenance. The machine learning model 525 can then provide its output (e.g., software package supply chain risk score, component-level supply chain risk scores, category scores at package or component level, etc.) to a consuming application or process 530.

Figure 7:
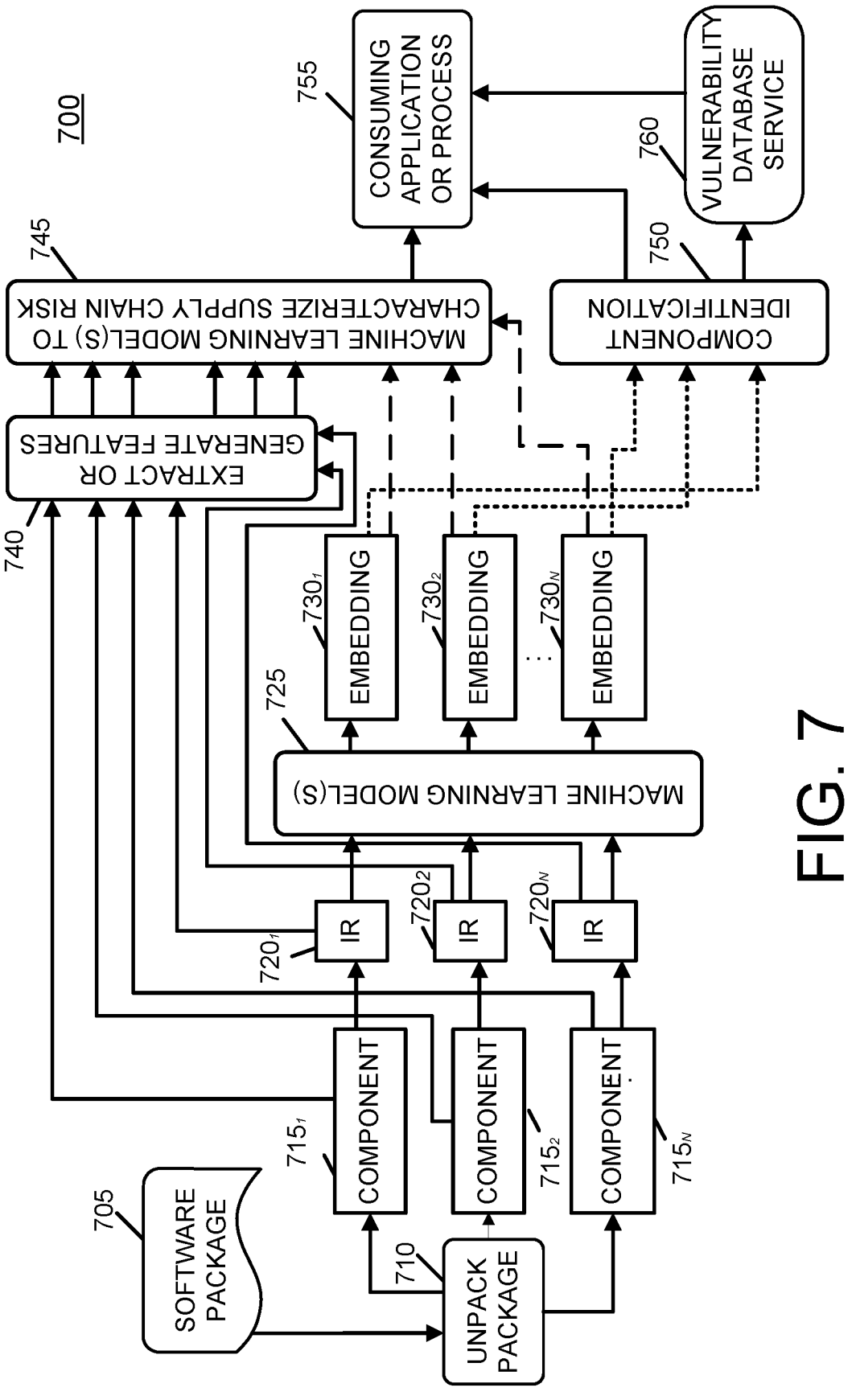
FIG. 7 is a third process flow diagram for identifying anomalous software packages or components therein using machine learning.

FIG. 7 is a diagram 700 illustrating a variation of FIG. 6 in which a software package 705 is also unpacked, at 710, into a plurality of components $715_{1 \ldots N}$. Similar to FIG. 6, these components $715_{1 \ldots N}$ are lifted into a respective inter mediate representation (IR) $720_{1 \ldots N}$. Various techniques can be used for lifting the components $715_{1 \ldots N}$ into the IRs $720_{1 \ldots N}$ including those described above. As an example, static binary translation techniques can be utilized that translate machine code instructions into IR. To lift the code to IR on the first step is to decode the machine code bytes to IR instruction. This decoding step takes raw instruction bytes, and turns them into a higher-level IR instruction. This decoding step takes raw instruction bytes, and turns them into a higher-level IR instruction.

These IRs $720_{1 \ldots N}$ are then inputted into one or more machine learning models 725 to generate embeddings $730_{1 \ldots N}$ through one or more dimensionality reduction processes. The one or more machine learning models 725 can take varying forms including those similar to those referenced above with regard to machine learning model 420. In some cases, there is an ensemble of machine learning models generating a plurality of embeddings for each IR $720_{1 \ldots N}$. The embeddings $730_{1 \ldots N}$ can be generated using word embedding techniques which learn dense vector representations of words from IR data. The embedding process can include, as part of preprocessing, tokenizing the input and optionally performing other preprocessing. An embedding layer is generated by creating an embedding matrix to store learned word vectors after which such embedding matrix is randomly initiated with a specified dimensionality.

These embeddings can be consumed by a component identification 750 module to identify the components $715_{1 \ldots N}$. The component identification module 750 can take various forms including machine learning-based identifications (based on training of such model with embeddings corresponding to known components) or distance-based similarity analyses (similar to those described above). In some variations, data characterizing the component identification 750 is sent directly to consuming application or process. Alternatively or in addition, a vulnerability database service 760 can be called to lookup any known risks associated with the identified components so that such information can be sent (either directly or by way of the component identification module 750) to a consuming application or process.

In a different path in FIG. 7, features are extracted or generated, at 740 based on the components $715_{1 \ldots N}$ and the IRs $720_{1 \ldots N}$. These features, along with embeddings $730_{1 \ldots N}$ can be input into one or more machine learning models 745 (such as those described above in connection with machine learning model 420) which are configured and trained to characterize software supply chain risk (i.e., such as the risks in the categories described above). The one or more machine learning models 745 can comprise a multi-class classifier and/or an ensemble of models which can characterize different attributes (e.g., different risk categories) of the components $715_{1 \ldots N}$ or software package 705 The output of such one or more machine learning models 745 is provided to a consuming application or process 755.

The output of the machine learning model 525 can then be used, at 545, to extract or generate features characterizing the identified components. These features are then used by a second machine learning model 550 which generates scores which characterize supply chain risk (e.g., software package supply chain risk score, component-level supply chain risk scores, category scores at package or component level, etc.) which in turn can be provided to a consuming application or process 530. In addition or as an alternative to the second machine learning model 550, the identified components can be used to lookup vulnerabilities for such components using the vulnerability database service 440.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for identifying software chain vulnerabilities using machine learning comprising:

receiving a software package;

unpacking the software package into a plurality of components, each component comprising a plurality of functions;

lifting each function of each component into a corresponding intermediate representation, the lifting comprising decoding machine code bytes corresponding to the function into a higher level intermediate representation instruction, the intermediate representation comprising data structure or code used by a compiler or virtual machine to represent corresponding low-level machine instructions and operational semantics of corresponding code, wherein the intermediate representation is in expression static single-assignment (SSA) form and, during the lifting, a control-flow graph (CFG) and a data-flow graph (DFG) for each function are reconstructed;

generating, for each intermediate representation, an embedding preserving code semantics from the corresponding component by inputting the corresponding intermediate representation into an embedding machine learning model configured to generate embeddings, wherein the embedding is generated directly from a tokenized intermediate representation in SSA;

extracting or deriving, from each intermediate representation, intermediate representation-derived data flow features comprising at least one of: detection of constant static variables on a stack, stack reaching definitions, uninitialized variables, and intra-procedural aliases;

inputting, on a component-by-component basis, the extracted or derived features from each intermediate representation along with a CFG-based embedding for each function into at least one machine learning model;

determining, by the at least one machine learning model in response to the inputting, a level of code similarity associated with the component, the at least one machine learning model being trained and configured to identify components directly from function-level intermediate representation embeddings and intermediate representation-derived data-flow features without reliance on exact-match hashing or database lookup; and providing the determined level of code similarity to a consuming application or process, the determined level of code similarity being used to identify software chain vulnerabilities.

2. The method of claim 1, wherein the provided determined level of code similarity comprises an identification of the corresponding component.

3. The method of claim 2, wherein the consuming application or process comprises a vulnerability database service, and the method further comprises:

returning software supply chain risk information for matching components.

4. The method of claim 1, wherein the at least one machine learning model comprises a semantics preserving code embedding model.

5. The method of claim 4, wherein the semantics preserving code embedding model comprises a recurrent neural network.

6. The method of claim 1, wherein the at least one machine learning model comprises a (CFG) similarity model, the CFG similarity model comprising a graph embedding model.

7. The method of claim 1 further comprising:

training the at least one machine learning model by extracting or deriving features from intermediate representations of functions from exemplary components and building function triplets and using a Siamese network with triplet loss.

8. The method of claim 1, wherein the consuming application or process comprises a second machine learning model configured and trained to characterize a supply chain risk score of the software package based on the determined level of code similarity, and the method further comprises: returning an output of the second machine learning model characterizing the supply chain risk score of the software package.

9. A system for identifying software chain vulnerabilities using machine learning comprising:

at least one data processor; and memory storing instructions which, when executed by the at least one data processor, result in operations comprising:

receiving a software package;

unpacking the software package into a plurality of components;

lifting each function of each component into a corresponding intermediate representation, the lifting comprising decoding machine code bytes corresponding to the function into a higher level intermediate representation instruction, the intermediate representation comprising data structure or code used by a compiler or virtual machine to represent corresponding low-level machine instructions and operational semantics of corresponding code, wherein, during the lifting, a control-flow graph (CFG) and a data-flow graph (DFG) for each function are reconstructed;

generating, for each intermediate representation, an embedding preserving code semantics from the corresponding component by inputting the corresponding intermediate representation into an embedding machine learning model configured to generate embeddings;

extracting or deriving, from each intermediate representation, intermediate representation-derived data flow features comprising at least one of: detection of constant static variables on a stack, stack reaching definitions, uninitialized variables, and intra-procedural aliases;

determining, for each component by inputting the corresponding features and a corresponding CFG embedding into at least one machine learning, a level of code similarity associated with the component, the at least one machine learning model being trained and configured to identify components; and providing the determined level of code similarity to a consuming application or process, the determined level of code similarity being used to identify software chain vulnerabilities.

10. The system of claim 9, wherein the provided determined level of code similarity comprises an identification of the corresponding component.

11. The system of claim 10, wherein the consuming application or process comprises a vulnerability database service, and the operations further comprise:

returning software supply chain risk information for matching components.

12. The system of claim 9, wherein the at least one machine learning model comprises a semantics preserving code embedding model.

13. The system of claim 12, wherein the semantics preserving code embedding model comprises a recurrent neural network.

14. The system of claim 9, wherein the at least one machine learning model comprises a (CFG) similarity model, the CFG similarity model comprising a graph embedding model.

15. The system of claim 9, wherein the operations further comprise: training the at least one machine learning model by extracting or deriving features from intermediate representations of functions from exemplary components and building function triplets and using a Siamese network with triplet loss.

16. The system of claim 9, wherein the consuming application or process comprises a second machine learning model configured and trained to characterize a supply chain risk score of the software package based on the determined level of code similarity and the operations further comprise: returning an output of the second machine learning model characterizing the supply chain risk score of the software package.

17. A method for identifying software chain vulnerabilities using machine learning comprising:

receiving a software package;

unpacking the software package into a plurality of components;

lifting each component into a corresponding intermediate representation, the lifting comprising decoding machine code bytes corresponding to the function into a higher level intermediate representation instruction, the intermediate representation comprising data structure or code used by a compiler or virtual machine to represent corresponding low-level machine instructions and operational semantics of corresponding code, wherein, during the lifting, a control-flow graph (CFG) and a data-flow graph (DFG) for each function are reconstructed;

extracting or deriving features from each of the components and their corresponding intermediate representations, the features comprising intermediate representation-derived data flow features including at least one of: detection of constant static variables on a stack, stack reaching definitions, uninitialized variables, and intraprocedural aliases;

determining, for each component by at least one first machine learning model using the extracted or derived features, software supply chain risk for the component;

providing data characterizing the determined supply chain risk for the components to a consuming application or process;

generating, for each intermediate representation, at least one embedding preserving code semantics from the corresponding component by inputting the intermediate representation into at least one second machine learning model;

determining, using a component identification module and based on the at least one embedding generated for each component, an identity of such component; and providing data the determined component identities to the consuming application or process, the determined level of code similarity being used to identify software chain vulnerabilities.

18. The method of claim 17 further comprising:

polling a vulnerability database service using determined component identities to identify risks associated with such components.

19. The method of claim 17, wherein the at least one first machine learning model comprises each of a semantics preserving code embedding model, a recurrent neural network, a control-flow graph (CFG) similarity model, a graph embedding model, a model trained by extracting or deriving features from intermediate representations of functions from exemplary components and building function triplets and using a Siamese network with triplet loss.

20. The method of claim 17, wherein the at least one first machine learning model comprises an ensemble of machine learning models or a multi-class classifier trained to score each of plurality of different supply chain risk categories.

21. The method of claim 20, wherein the different supply chain risk categories comprise one or more of: an open-source software control category which characterizes risks of changes introduced by new versions, a vulnerability category which characterizes security risks in components, a license category which characterizes risks associated with compliance of intellectual property (IP) legal requirements, a development category which characterizes risks of compatibility between a pre-defined codebase and open-source software, and/or a support category which characterizes risks associated with older or obsolete software components.

22. The method of claim 1, further comprising, prior to the lifting, enriching component metadata by updating the metadata with information from a type database and a debugging database to form an annotated component.

23. The method of claim 22, wherein extracting or deriving the IR-derived data flow features further comprises generating behavioral summaries for each function and identifying intraprocedural aliases.

24. The method of claim 23, wherein generating, for each intermediate representation, an embedding preserving code semantics comprises tokenizing the intermediate representation and inputting the tokenized intermediate representation into a machine learning model to generate a function-level embedding.

* * * * *